United States Patent
Kiss et al.

(10) Patent No.: US 10,911,747 B1
(45) Date of Patent: Feb. 2, 2021

(54) SYSTEMS AND METHODS FOR UTILIZING MODELING TO AUTOMATICALLY DETERMINE CONFIGURATION PARAMETERS FOR CAMERAS

(71) Applicant: Verizon Patent and Licensing Inc., Arlington, VA (US)

(72) Inventors: Akos Kiss, Budapest (HU); Istvan S. Horvath, Budapest (HU); Peter Ruzsa, Budapest (HU); Gabor Erdosi, Budapest (HU); Dora E. Babicz, Budapest (HU); Andrew W. Herson, Berkeley, CA (US); Csaba Rekeczky, Monte Sereno, CA (US)

(73) Assignee: Verizon Patent and Licensing Inc., Basking Ridge, NJ (US)

(\*) Notice: Subject to any disclaimer, the term of this patent is extended or adjusted under 35 U.S.C. 154(b) by 0 days.

(21) Appl. No.: 16/700,631

(22) Filed: Dec. 2, 2019

(51) Int. Cl.
| | |
|---|---|
| *H04N 17/00* | (2006.01) |
| *H04N 5/232* | (2006.01) |
| *G06K 9/00* | (2006.01) |
| *G06T 7/80* | (2017.01) |

(52) U.S. Cl.
CPC ....... *H04N 17/002* (2013.01); *G06K 9/00798* (2013.01); *G06K 9/00805* (2013.01); *G06K 9/00812* (2013.01); *G06T 7/80* (2017.01); *H04N 5/23206* (2013.01); *H04N 5/23216* (2013.01)

(58) Field of Classification Search
CPC .............. H04N 17/002; H04N 5/23206; H04N 5/23216; G06T 7/80; G06K 9/00798; G06K 9/00805; G06K 9/00812
See application file for complete search history.

(56) References Cited

U.S. PATENT DOCUMENTS

| | | | |
|---|---|---|---|
| 2006/0197839 A1* | 9/2006 | Senior | H04N 5/232 348/169 |
| 2009/0109216 A1* | 4/2009 | Uetabira | G06F 16/9577 345/419 |
| 2012/0196679 A1* | 8/2012 | Newcombe | G06T 7/251 463/36 |
| 2014/0211203 A1* | 7/2014 | Kuo | G03B 17/565 356/124 |

(Continued)

OTHER PUBLICATIONS

Shichao Yang et al., "CubeSLAM: Monocular 3D Object SLAM", https://arxiv.org/abs/1806.00557, Jun. 1, 2018, 14 pages.

(Continued)

*Primary Examiner* — Michael E Teitelbaum

(57) ABSTRACT

A device may receive initial registration data identifying initial camera parameters associated with a camera device provided at a location, and may receive location data associated with the location captured by the camera device. The device may receive map data identifying a map image of the location, and may transform the initial registration data into estimated camera parameters. The device may process the location data, with the estimator model, to generate extracted data, and may process the estimated camera parameters, the extracted data, and the map data, with a parameter optimization model, to identify camera parameters for the camera device. The device may provide the camera parameters to the camera device to cause the camera device to be configured based on the camera parameters.

20 Claims, 11 Drawing Sheets

(56) References Cited

U.S. PATENT DOCUMENTS

2015/0022666 A1* 1/2015 Kay ............... H04L 65/4084
                                              348/159

OTHER PUBLICATIONS

Sergey Zakharov et al., "DPOD: 6D Pose Object Detector and Refiner", https://arxiv.org/abs/1902.11020, Feb. 28, 2019, 17 pages.
Florian Chabot et al., "Deep MANTA: A Coarse-to-tine Many-Task Network for joint 2D and 3D vehicle analysis from monocular image", https://arxiv.org/abs/1703.07570, Mar. 22, 2017, 10 pages.
Arsalan Mousavian et al., "3D Bounding Box Estimation Using Deep Learning and Geometry", Dec. 1, 2016, 10 pages.

* cited by examiner

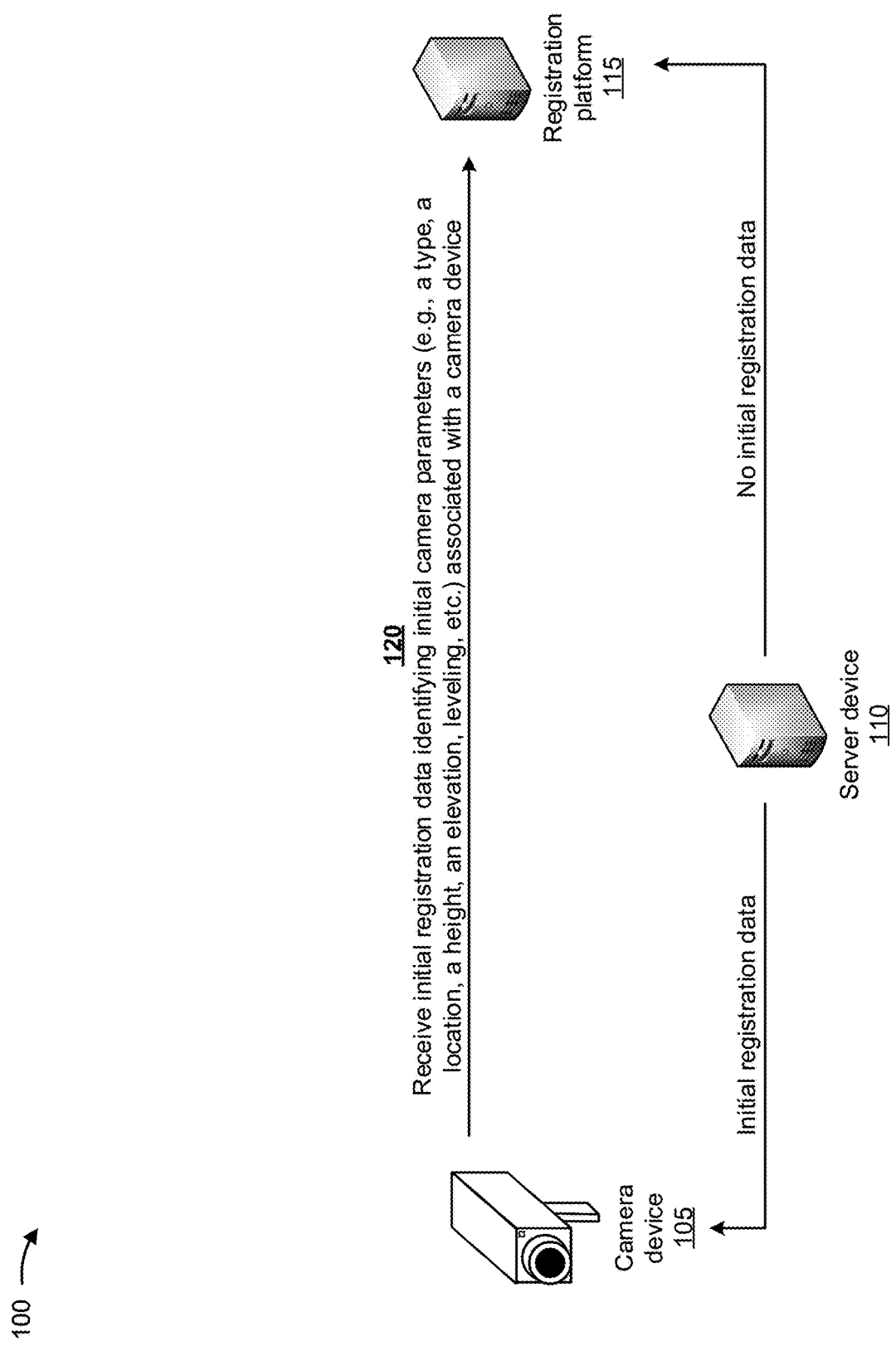

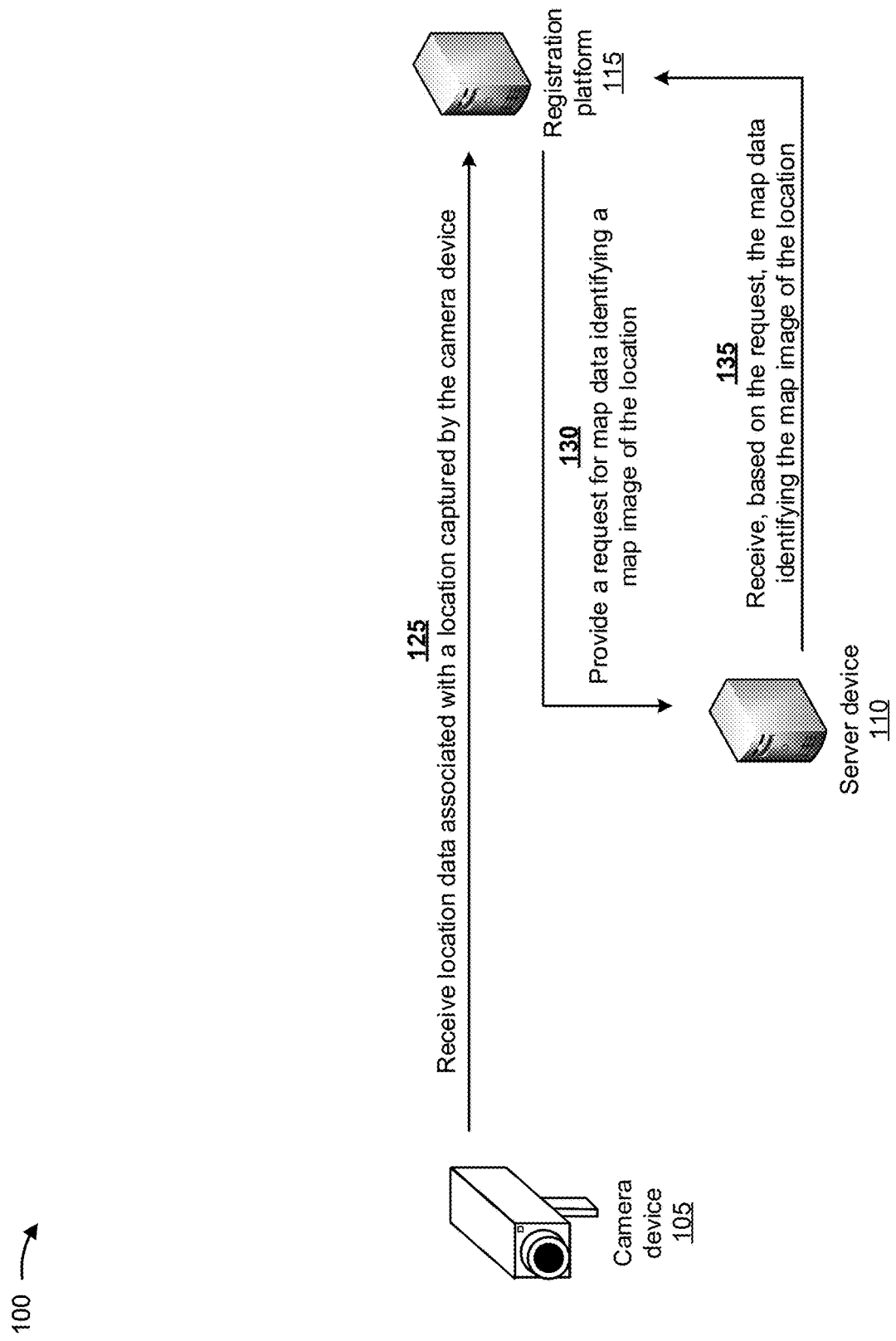

SYSTEMS AND METHODS FOR UTILIZING MODELING TO AUTOMATICALLY DETERMINE CONFIGURATION PARAMETERS FOR CAMERAS

BACKGROUND

"Smart city" systems may be utilized to analyze traffic patterns, monitor utilities, monitor resources, and/or the like. Smart city systems process and analyze data received from cameras, sensors, and/or the like deployed over a geographic area in near-real time or off-line to support numerous vertical applications delivering services to the city, such as traffic monitoring, gunshot detection, parking management, safety services, and/or the like.

BRIEF DESCRIPTION OF THE DRAWINGS

FIGS. 1A-1H are diagrams of one or more example implementations described herein.

DETAILED DESCRIPTION OF PREFERRED EMBODIMENTS

Figure 1C:
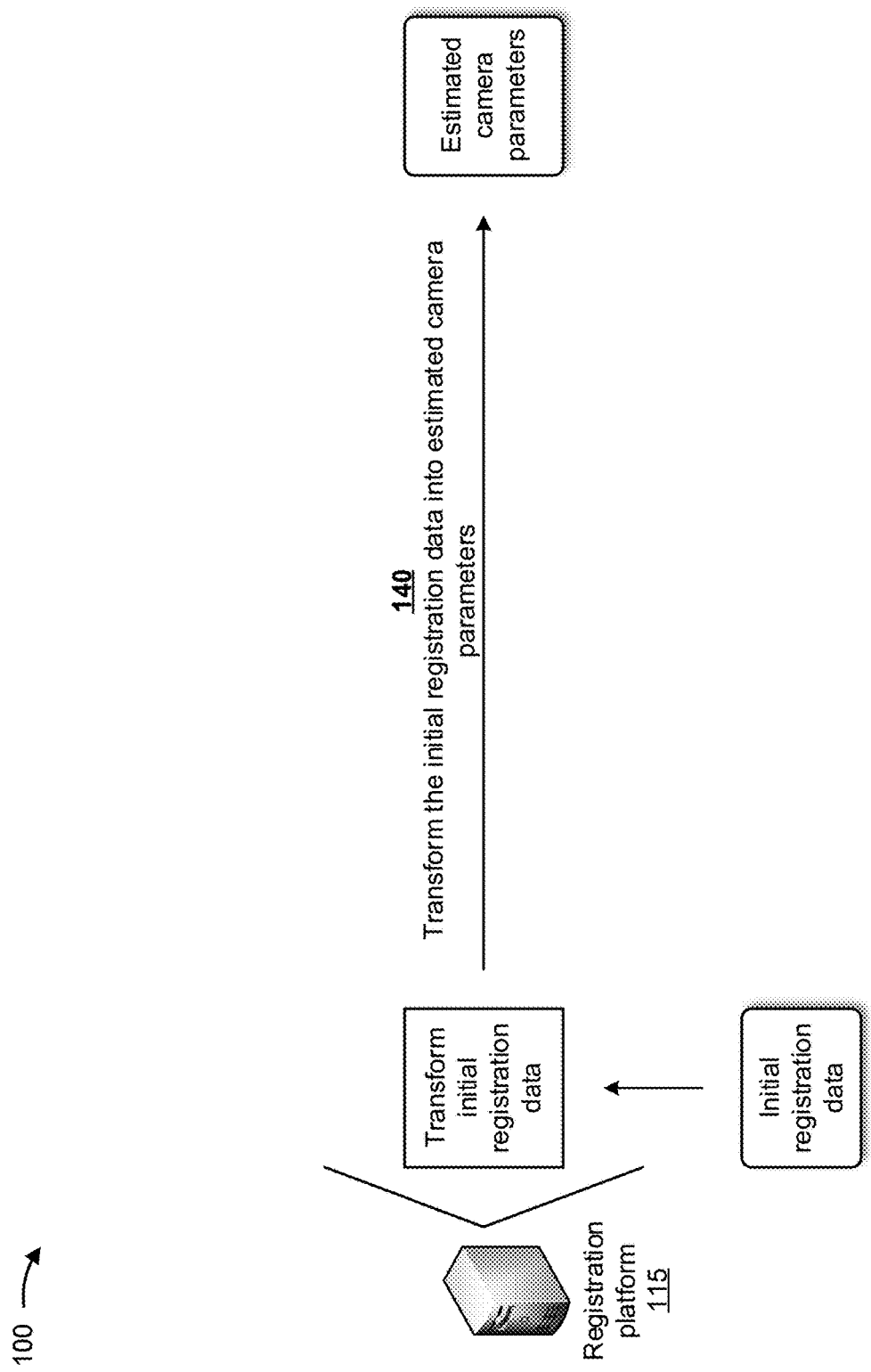

The following detailed description of example implementations refers to the accompanying drawings. The same reference numbers in different drawings may identify the same or similar elements.

Deploying and configuring a large quantity of camera devices throughout a geographic area for a smart city system is a time-consuming and inefficient process. For example, for each deployed camera device, a technician may need to manually determine the proper configuration parameters for achieving optimal video capture by the camera device. For example, a technician may need to make measurements (e.g., via a user device, such as a tablet computer) on an image captured by the camera device to determine features associated with the camera device. The technician (e.g., the user device) may utilize the features and location information for the location where the camera will be capturing video to calculate configuration parameters (e.g., calibration parameters, video parameters, and/or the like), and/or the like of the camera device, and may configure and/or calibrate the camera device with the configuration parameters. Thus, current techniques waste computing resources (e.g., processing resources, memory resources, communication resources, and/or the like), networking resources, human resources, transportation resources, and/or the like associated with manually determining the configuration parameters, determining incorrect configuration parameters, correcting incorrectly determined configuration parameters, and/or the like.

Some implementations described herein provide a registration platform that utilizes modeling to automatically determine configuration parameters for deployed camera devices. For example, the registration platform may receive initial registration data identifying initial camera parameters associated with a camera device provided at a location, and may receive location data (e.g., location images and/or annotations) of the location captured by the camera device. In some implementations, the registration platform may receive map data identifying a map image of the location. The registration platform may transform the initial registration data into estimated camera parameters, and may process the location data, with an estimator model, to generate extracted data. The registration platform may process the estimated camera parameters, the extracted data, and the map data, with a parameter optimization model, to identify camera parameters for the camera device. The registration platform may process the extracted data, the map data, and the camera parameters, with a scene model, to identify event parameters, and may provide the camera parameters and the event parameters to the camera device to cause the camera device to be configured based on the camera parameters and the event parameters.

In this way, the registration platform utilizes modeling to automatically determine configuration parameters for camera devices deployed in a smart city system over a geographic area, which enables seamless and efficient installation of the camera devices, and optimization of the cameras for their desired purpose of capturing images of certain locations. Thus, the registration platform reduces time required to install and configure camera devices in a smart city system, and conserves computing resources, networking resources, human resources, transportation resources, and/or the like that would otherwise be wasted manually determining the configuration parameters, incorrectly determining the configuration parameters, correcting incorrectly determined configuration parameters, and/or the like.

FIGS. 1A-1H are diagrams of one or more example implementations 100 described herein. As shown in FIG. 1A, a camera device 105 may be associated with a server device 110 and a registration platform 115. In some implementations, camera device 105 may include a digital camera, a video camera, and/or the like that may capture images and/or video at a location of camera device 105. Server device 110 may include a device that stores and provides initial camera parameters to registration platform 115. Registration platform 115 may include a platform that utilizes modeling to automatically determine configuration parameters for camera device 105.

As further shown in FIG. 1A, and by reference number 120, registration platform 115 may receive, from camera device 105, initial registration data identifying initial camera parameters associated with camera device 105. In some implementations, the initial camera parameters may include parameters identifying a type of device associated with camera device 105 (e.g., model number, brand, serial number, camera type), parameters identifying a location of camera device 105 (e.g., latitude and longitude coordinates), parameters identifying a height associated with camera device 105, parameters identifying an elevation associated with camera device 105, parameters identifying a leveling associated with camera device 105, parameters identifying a yaw associated with camera device 105, and/or the like. In some implementations, the initial registration data may include initial camera parameters, may not include the initial camera parameters, may include a portion of the initial camera parameters, and/or the like. In some implementations, server device 110 may store the initial registration data (e.g., provided by an installer when the camera is installed), and may be provided to camera device 105 when camera device 105 is installed, registered, serviced, upgraded, and/or the like. Camera device 105 may then provide the initial registration data to registration platform. In some implementations, registration platform 115 may receive the initial registration data based on a request provided to camera device 105. Registration platform 115 may store the initial registration data in a data structure (e.g., a database, a table, a list, and/or the like) associated with registration platform 115.

Alternatively, or additionally, registration platform 115 may receive the initial registration data directly from server device 110 (e.g., based on providing information identifying camera device 105 to server device 110). In some implementations, registration platform 115 may not receive the initial registration data when the initial registration data is not available for camera device 105.

As shown in FIG. 1B, and by reference number 125, registration platform 115 may receive, from camera device 105, location data (e.g., one or more location images and/or annotations) of a location captured by camera device 105. For example, registration platform 115 may provide a request to camera device 105 that causes camera device 105 to capture and provide one or more current images, to provide one or more stored images (e.g., captured and saved images), and/or the like to registration platform 115. Alternatively, registration platform 115 may obtain the location data from another device (e.g., server device 110) that receives and/or stores location data from camera device 105. In some implementations, registration platform 115 may store the location data in a data structure (e.g., a database, a table, a list, and/or the like) associated with registration platform 115.

As further shown in FIG. 1B, and by reference number 130, in some implementations registration platform 115 may provide, to server device 110, a request for map data identifying a map image and/or annotations of the location. For example, registration platform 115 may determine the location of camera device 105 based on the initial registration data or the location data, and may provide the request and location data (e.g., global positioning system (GPS) coordinates) associated with the location of camera device 105 to server device 110. In some implementations, the map data may include an aerial image (e.g., an overhead view or an annotation of the aerial image) of a geographical area at the location.

As further shown in FIG. 1B, and by reference number 135, registration platform 115 may receive, from server device 110 and based on the request, the map data identifying the map image of the location. In some implementations, server device 110 may obtain the map data from a map service provider (e.g., The National Map of the United States Geological Survey (USGS) National Geospatial Program). Registration platform 115 may store map data in a data structure (e.g., a database, a table, a list, and/or the like) associated with registration platform 115. In some implementations, rather than obtaining the map data from server device 110, registration platform 115 may receive the map data from a map service provider.

As shown in FIG. 1C, and by reference number 140, registration platform 115 may transform the initial registration data into estimated camera parameters. In some implementations, the estimated camera parameters may include an estimated orientation, estimated metric information, an estimated ground plane, and/or the like. Registration platform 115 may determine the estimated orientation of camera device 105 based on the initial registration data identifying a planar ground, a yaw angle, a leveling angle, and an elevation angle associated with camera device 105. Registration platform 115 may determine the estimated metric information of camera device 105 based on the estimated orientation and the location and height associated with camera device 105. Registration platform 115 may determine the estimated ground plane of camera device 105 based on the estimated orientation and the estimated metric information. In some implementations, registration platform 115 may process the initial registration data to generate estimated camera parameters only if registration platform 115 received initial registration data that identifies at least some (e.g., one or more) initial camera parameters, as described above with respect to FIG. 1A.

In some implementations, the initial registration data may be available and registration platform 115 may determine intrinsic parameters of camera device 105 and a lens distortion model based on the initial registration data. When the initial registration data is available, registration platform 115 may directly compute object parameters from a ground surface which, in conjunction with measurements, may provide a target error function of nonlinear optimization. However, density or quality of measurements might be inadequate, and registration platform 115 may add more constraints (e.g., assume a planar ground surface that is applicable, at least locally, to many surveillance use cases). This will introduce a large quantity of noise canceling capability to the optimization process.

If a planar ground is assumed, registration platform 115 may utilize an elevation angle or any characteristic points relative to an object that encodes information like endpoints of virtual rods in specific directions with specific length (e.g., of objects in three different positions) to infer camera orientation of camera device 105. With a quantity of noise received, registration platform 115 may utilize more measurements in more positions (e.g., but still a nonlinear optimization after a robust filtering) to infer the camera orientation.

The camera orientation of camera device 105 may not provide metric information of a scene. Registration platform 115 may add any measurement that provides information about a GPS coordinates of camera device 105 (e.g., which enables metric registration) to determine how high camera device 105 is mounted. After metric registration, registration platform 115 may perform arbitrary measurements on known geometric primitives in the scene (e.g., a ground plane).

If size and elevation information on observed objects is available, registration platform 115 may utilize such information to determine a ground surface for a camera model. A nonlinear optimization model may be utilized to infer a proper deformation model of a ground plane so that measurements fit object parameters computed using camera and ground parameters.

Registration platform 115 may utilize additional information about a scene to make the camera model more aligned with actual geometry (e.g., based on approximate parameters, such as a coarse location and an orientation of camera device 105 that make localization faster and more robust). A ground surface may be important because it may be extremely difficult to reconstruct lens distortion and ground surface at the same time. If a map of the location, with the exact location and extent of specific objects, is available, registration platform 115 may detect these objects on a camera image and may utilize the objects to output a geometrically correct model. Without such object, a resulting model may be incorrect in a sense that the model may implicate invalid ground surface or lens distortion model. The objects may include lanes, pedestrian crossings, sidewalks, and/or the like. Registration platform 115 may automatically annotate the map and may automatically extract information from the image. Since a local model estimator works on specific objects, some information may be extracted from static analysis or dynamic analysis of estimations, without images (e.g., lanes, crossings, sidewalks, and/or the like).

In some implementations, the initial registration data may be unavailable and registration platform 115 may estimate intrinsic parameters of camera device 105 (e.g., focal, optical center, or distortion coefficients in case of a common camera or a fisheye camera), and may perform calibration of camera device 105 using images of a well-structured pattern (e.g., a large quantity of precise measurements). If only imprecise measurements are available, registration platform 115 may utilize several measurements and robust filtering.

Registration platform 115 may limit a quantity of unknowns based on assumptions, such as assumptions that modern imaging sensors have rectangular pixels, do not suffer from skew, and an optical center that is close to an image center. One property of an unknown camera device is a field of view. If the ground is planar, an elevation may be enough for registration platform 115 to simultaneously infer a camera orientation and the field of view because the field of view determines how fast elevation changes with position in a camera image. Furthermore, if a planar ground is assumed, registration platform may estimate a lens distortion because lens distortion is the only nonlinear function in a projection model of camera device 105 (e.g., lens distortion may be detached from the ground surface).

An uncalibrated camera device 105 provides no metric information, and registration platform 115 may perform measurements that connect camera parameters to the world (e.g., gradients of specific directions around detected objects, endpoints of virtual rods in specific real world directions with specific length, and/or the like). Registration platform 115 may merge various data sets acquired by different camera devices 105 and may train and execute a single estimation model on various video inputs. The more information (e.g., gradients in more directions) available, the more the model may be constrained. For traffic surveillance, vehicles may be candidates for this task. After distinguishing types of vehicles, registration platform 115 may determine an estimate of vehicle size. Information about vehicle size may provide constraints needed for metric registration and camera calibration.

To infer a ground surface, registration platform 115 may require more information so that registration platform 115 may split an estimated surface into a superposition of two nonlinear models (e.g., lens distortion and ground surface). If a simple distortion model (e.g., a pure radial distortion that works well for modern consumer grade imaging sensors) is utilized, registration platform 115 may utilize symmetry in a camera image around an optical center. Moreover, since road surface normals may not be entirely arbitrary (e.g., a roll of a vehicle is usually zero in roll-pitch-yaw angle), road surface normals may provide constraints that may help to separate distortion from a surface. A limited ground surface model with only a few parameters describing typical roads on a hillside may provide more reliable camera and ground models.

When a ground surface is unknown, road surface normals may not be reliable for camera registration since there may be steep roads, lanes, and/or the like. However, pedestrians may stand approximately vertical independent of the ground surface. Thus, estimating orientation of pedestrians may provide registration platform 115 with information about a true vertical direction, which may be helpful for ground surface reconstruction.

In some implementations, camera devices 105 of a same type and equipped with a same type of lens, may include the same focal and distortion coefficients, but may include a significant deviation in optical center. If a deployment of multiple camera devices 105 of the same type are available, registration platform 115 may apply a batch optimization while connecting common parameters expected to be common. This may increase a quantity of information utilized in estimating these parameters. The following table provides information regarding the initial registration data and data requirements.

| Camera known | Ground known | Estimation | Data requirement |
| --- | --- | --- | --- |
| Yes | Plane | Camera location, orientation | Low, can be noisy |
| Yes | No | Camera location, orientation, ground surface (one nonlinearity) | Medium, low level of noise is acceptable |
| Partially | Plane | Some camera parameters, camera location, orientation (one nonlinearity) | Medium, low level of noise is acceptable |
| Partially | Plane | Common camera parameters, camera location, orientation (one nonlinearity) | Medium, low level of noise is acceptable |
| No | Plane | Camera parameters, camera location, orientation (one nonlinearity) | High, strong nose reduction is required using robust filtering |
| No | No | Camera parameters, camera location, orientation, ground surface, (superposition of two nonlinearities) | High, strong nose reduction is required using robust filtering |

In some implementations, the camera parameter may include a parameter describing an orientation of camera device 105 (e.g., an extrinsic parameter), a parameter describing a location of camera device 105 (e.g., an extrinsic parameter), a parameter describing a horizontal and a vertical field of view angle (e.g., an intrinsic parameter), a distortion model and model parameters (e.g., an intrinsic parameter, where different model may be used for a normal camera device 105 than for a wide angle or fisheye camera device 105), a parameter describing an optical center, and/or the like. The optical center parameter is a special distortion parameter since most distortion models include the parameter. Standard representations of extrinsic parameters may include a rotation or orientation matrix and a translation vector for video analytics; and roll, pitch, yaw, Euler angles, elevation, leveling (e.g., roll angle), latitude, longitude, height above ground, and/or the like for a design tool.

Figure 1D:
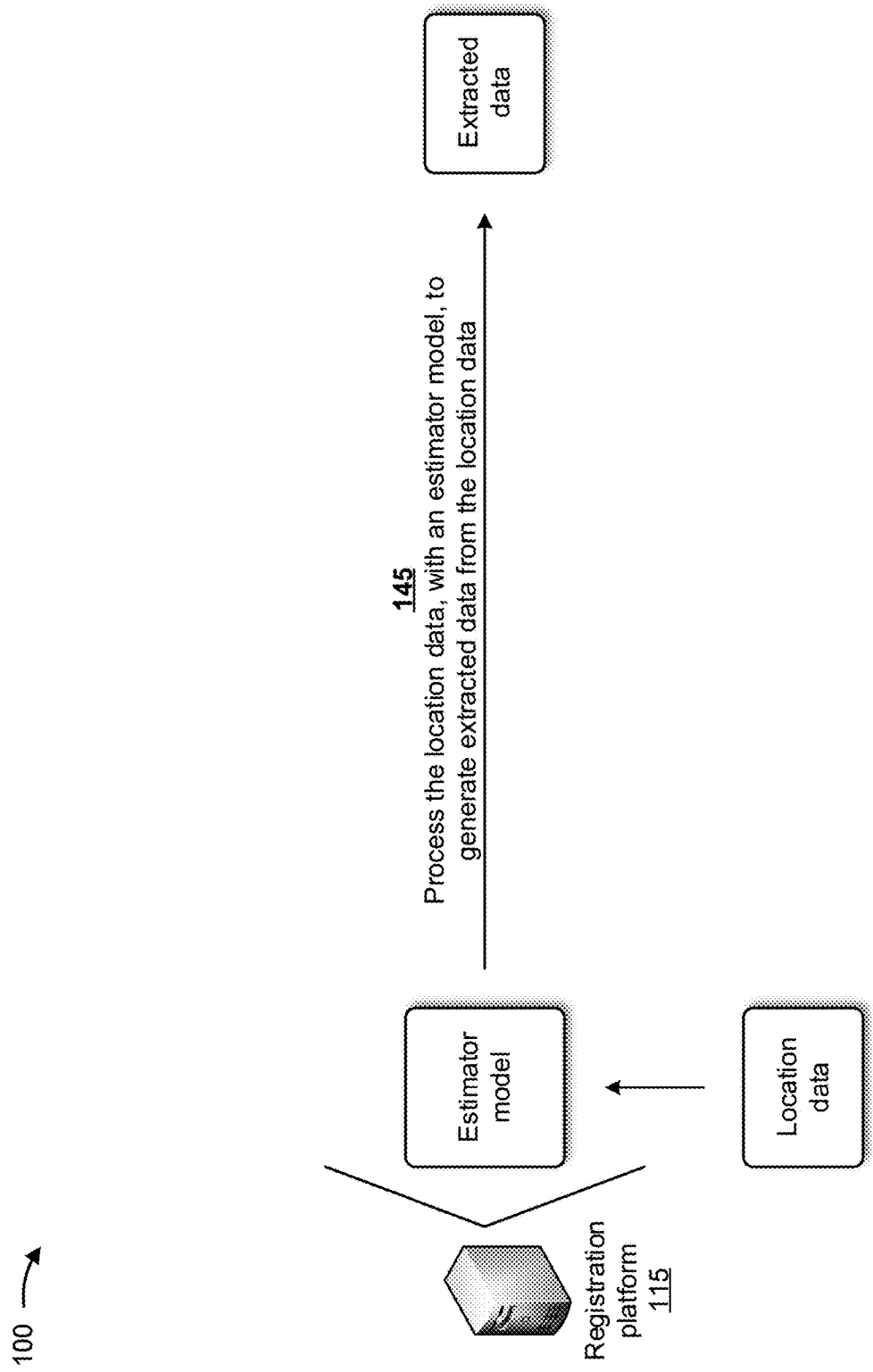

As shown in FIG. 1D, and by reference number 145, registration platform 115 may process the location data, with an estimator model, to generate extracted data. In some implementations, registration platform 115 may utilize one of more the techniques described above in connection with FIG. 1C to generate the extracted data (e.g., which may include one or more of the estimated camera parameters). In some implementations, the extracted data may include an estimated field of view (e.g., a horizontal and vertical field of view or angle), an estimated lens distortion, estimated metric information, an estimated ground plane, and/or the like. Registration platform 115 may determine the estimated field of view of camera device 105 based on camera parameters. For example, registration platform 115 may determine the estimated field of view (e.g., horizontal and vertical view angle of camera device 105) based on how fast the elevation angle changes when positions change in a location image. Registration platform 115 may determine the estimated lens distortion of camera device 105 based on a planar ground associated with camera device 105. Registration platform 115 may determine the estimated metric information of camera device 105 based on objects included in the location data. For example, registration platform 115 may merge data sets acquired from different camera devices 105 to determine the sizes of particular types of objects, and may determine the estimated metric information of camera device 105 based on GPS coordinates of camera device 105. Registration platform 115 may determine the estimated ground plane of camera device 105 based on the estimated lens distortion. For example, registration platform 115 may apply a radial distortion or fisheye lens model to determine the estimated ground plane of camera device 105.

As an example, camera device 105 deployed in a roadway intersection may use the presence of vehicles and/or pedestrians in the image (e.g., which may have established or predicted ranges of sizes, shapes, and orientations) to determine ground planes, viewing angles, lens distortions, and/or the like.

In some implementations, when processing the location data to generate the extracted data, registration platform 115 may receive additional location data from camera device 105 and/or from a plurality of camera devices 105 substantially similar to camera device 105. In this case, registration platform 115 may process the location data and the additional location data, with the estimator model, to generate the extracted data. For example, registration platform 115 may receive the additional location data from camera devices 105 equipped with a same type of lens (e.g., having same or similar focal and distortion coefficients) and may apply a batch optimization to increase the amount of information that can be utilized to generate the extracted data.

In some implementations, registration platform 115 may process the location data to generate extracted data when registration platform 115 does not receive and process the initial registration data to generate the estimated camera parameters, when registration platform 115 receives and processes the initial registration data to generate the estimated camera parameters, and/or the like. In some implementations, registration platform 115 may improve an accuracy of the estimated camera parameters based on the extracted data, may improve an accuracy of the extracted data based on the estimated camera parameters, and/or the like.

In some implementations, the estimator model may include an image and/or video analytics model that estimates local geometry (e.g., meter and/or pixel gradients, similarly endpoints of perpendicular rods of specific size, real world directions, and/or the like) around objects of interest (e.g., vehicles, pedestrians, and/or the like). In some implementations, the estimator model may include a machine learning model. Registration platform 115 may train the machine learning model with historical data (e.g., historical initial camera parameters; historical data identifying planar grounds, elevation angles, orientations, object sizes, and/or the like; historical metric information; and/or the like) to generate extracted data associated with a camera device.

In some implementations, when training the machine learning model, registration platform 115 may separate the historical data into a training set, a validation set, a test set, and/or the like. The training set may be utilized to train the machine learning model. The validation set may be utilized to validate results of the trained machine learning model. The test set may be utilized to test operation of the machine learning model.

In some implementations, registration platform 115 may train the machine learning model using, for example, an unsupervised training procedure. For example, registration platform 115 may perform dimensionality reduction to reduce the historical data to a minimum feature set, thereby reducing resources (e.g., processing resources, memory resources, and/or the like) to train the machine learning model, and may apply a classification technique to the minimum feature set.

In some implementations, registration platform 115 may use a logistic regression classification technique to determine a categorical outcome (e.g., that the location data indicates particular orientations, metric information, estimated ground planes, and/or the like). Additionally, or alternatively, registration platform 115 may use a naïve Bayesian classifier technique. In this case, registration platform 115 may perform binary recursive partitioning to split the historical data into partitions and/or branches and use the partitions and/or branches to determine outcomes (e.g., that the location data indicates particular orientations, metric information, estimated ground planes, and/or the like). Based on using recursive partitioning, registration platform 115 may reduce utilization of computing resources relative to manual, linear sorting and analysis of data points, thereby enabling the use of thousands, millions, or billions of data points to train the machine learning model, which may result in a more accurate model than using fewer data points.

Additionally, or alternatively, registration platform 115 may use a support vector machine (SVM) classifier technique to generate a non-linear boundary between data points in the training set. In this case, the non-linear boundary is used to classify test data into a particular class.

Additionally, or alternatively, registration platform 115 may train the machine learning model using a supervised training procedure that includes receiving input to the machine learning model from a subject matter expert, which may reduce an amount of time, an amount of processing resources, and/or the like to train the machine learning model relative to an unsupervised training procedure. In some implementations, registration platform 115 may use one or more other model training techniques, such as a neural network technique, a latent semantic indexing technique, and/or the like. For example, registration platform 115 may perform an artificial neural network processing technique (e.g., using a ten-layer feedforward classification or regression neural network architecture, an eleven-layer feedforward classification or regression neural network architecture, and/or the like) to perform pattern recognition with regard to patterns of the historical data. In this case, using the artificial neural network processing technique may improve an accuracy of the trained machine learning model generated by registration platform 115 by being more robust to noisy, imprecise, or incomplete data, and by enabling registration platform 115 to detect patterns and/or trends undetectable to human analysts or systems using less complex techniques.

In some implementations, rather than training the machine learning model, registration platform 115 may receive a trained machine learning model from another device (e.g., server device 110). For example, server device 110 may generate the trained machine learning model based on having trained the machine learning model in a manner similar to that described above, and may provide the trained machine learning model to registration platform 115 (e.g., may pre-load registration platform 115 with the trained machine learning model, may receive a request from registration platform 115 for the trained machine learning model, and/or the like).

Figure 1E:
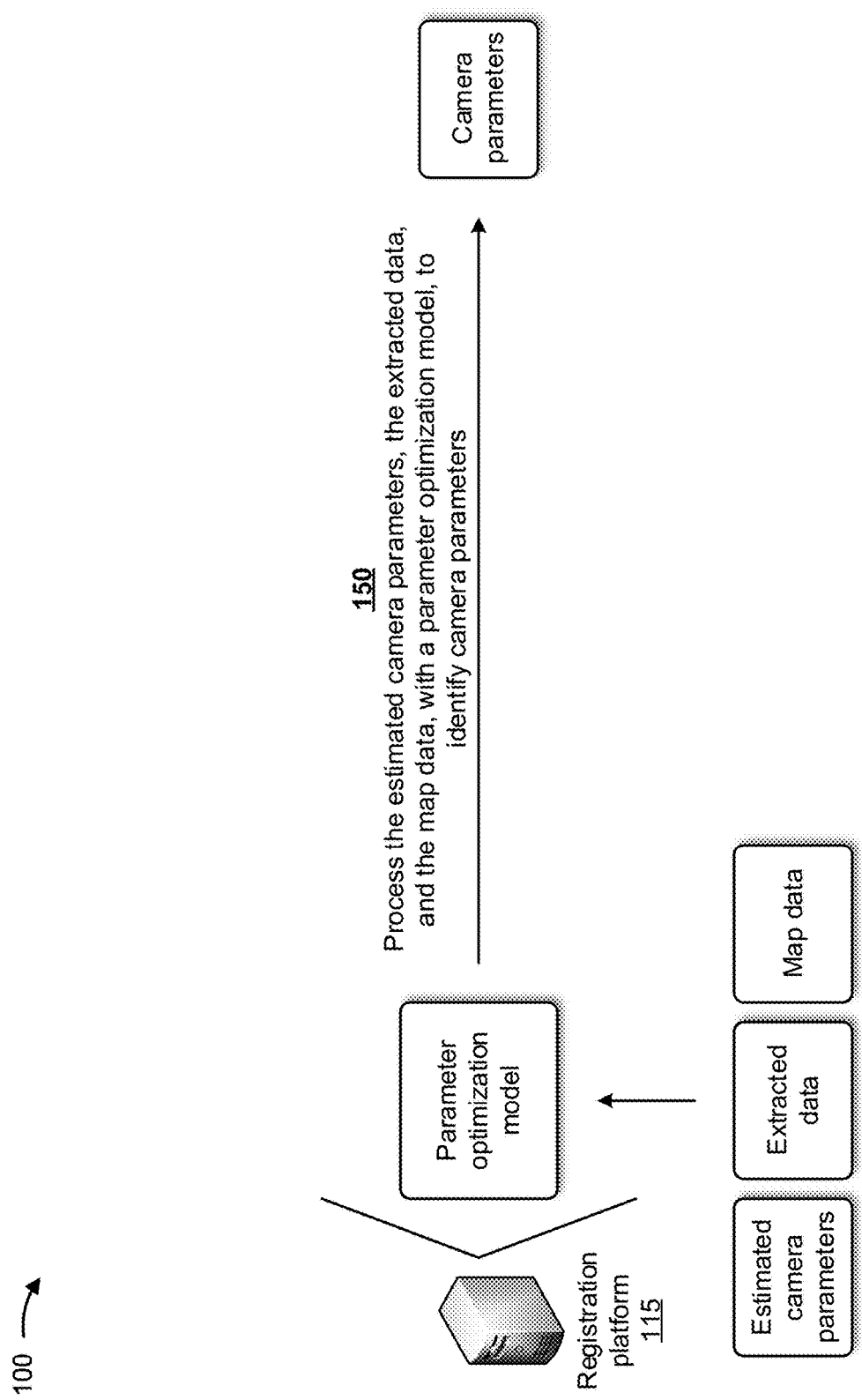

As shown in FIG. 1E, and by reference number 150, registration platform 115 may process the estimated camera parameters, the extracted data, and the map data (e.g., which may be optional), with a parameter optimization model, to identify camera parameters. In some implementations, registration platform 115 may utilize one of more the techniques described above in connection with FIG. 1C to identify the camera parameters (e.g., which may include one or more of the estimated camera parameters). In some implementations, the camera parameters may include a parameter identifying a type of device associated with camera device 105, a parameter identifying a location of camera device 105, a parameter identifying a height associated with camera device 105, a parameter identifying an elevation associated with camera device 105, a parameter identifying a leveling associated with camera device 105, a parameter identifying an orientation of camera device 105, a parameter identifying metric information associated with camera device 105, a parameter identifying a ground plane of camera device 105, a parameter identifying a field of view of camera device 105, a parameter identifying a lens distortion of camera device 105, a parameter identifying a yaw associated with camera device 105, and/or the like. In some implementations, the parameter optimization model may include a nonlinear optimization model that optimizes the camera parameters. In some implementations, registration platform 115 may apply robust filtering to the estimations of the estimator model prior to processing the estimated camera parameters, the extracted data, and/or the map data with the parameter optimization model. Robust filtering may be utilized to eliminate noisy estimations, false positives, false negatives, and/or the like. False negatives (e.g., missed objects) may be the least problematic, but false positives and high noise estimations may make optimization difficult or even make optimization converge to an incorrect model.

In some implementations, the parameter optimization model may include a machine learning model. Registration platform 115 may train the parameter optimization model with historical data (e.g., historical estimated camera parameters, historical extracted data, historical location data, historical map data, and/or the like) to generate camera parameters. For example, registration platform 115 may train the parameter optimization model in a manner similar to the estimator model described above in connection with FIG. 1D. In some implementations, rather than training the parameter optimization model, registration platform 115 may obtain the parameter optimization model from another system or device that trained the parameter optimization model. In this case, registration platform 115 may provide the other system or device with historical data for use in training the parameter optimization model, and may provide the other system or device with updated historical data to retrain the parameter optimization model in order to update the parameter optimization model.

Figure 1F:
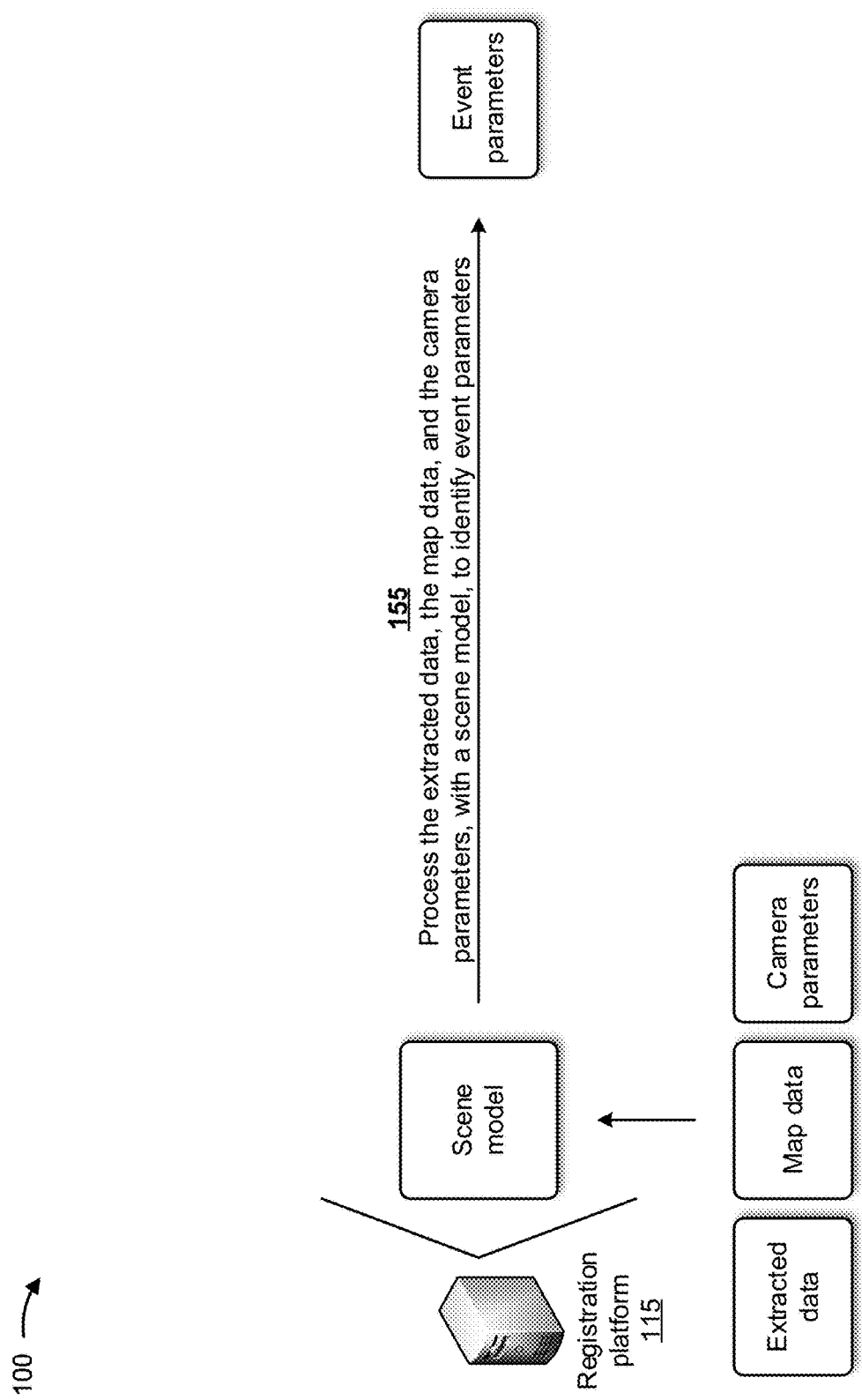

As shown in FIG. 1F, and by reference number 155, registration platform 115 may process the extracted data, the map data, and the camera parameters, with a scene model, to identify event parameters. In some implementations, registration platform 115 may segment a scene of the extracted data into segments that play a functional role in the scene. For example, in a traffic management scenario, camera device 105 may segment a scene into parking spaces, roads, sidewalks, pedestrian crossings, road lanes, and/or the like. In some implementations, the event parameters may include a parameter identifying a parking space at the location, a parameter identifying a road surface at the location, a parameter identifying a road marker at the location, a parameter identifying a traffic signal at the location, a parameter identifying a pedestrian crosswalk at the location, a parameter identifying a road lane at the location, a parameter identifying a sidewalk at the location, and/or the like. In some implementations, registration platform 115 may segment a scene captured by camera device 105, may segment a scene associated with map data of the same location, and may refine the event parameters by comparing the scene captured by camera device 105 and the scene associated with the map data. The scene segmentation may be a variant of a map annotation that can be used in the event configuration and in the registration process. The annotation may be provided by server device 110 or determined automatically by registration platform 115 from the map data.

In some implementations, the scene model may include a static analysis model (e.g., that disregards temporal coherence of data collected), and registration platform 115 may process the extracted data, the map data, and the camera parameters, with the static analysis model, to identify the event parameters. In some implementations, the static analysis model may utilize multiple images of a same scene (e.g., captured at different times) in order to more completely capture the scene. For example, portions of the scene that may be blocked from a view (e.g., by a moving vehicle) of camera device 105 at one time may not be blocked from the view of camera device 105 at another time.

Additionally, or alternatively, registration platform 115 may process the extracted data, the map data, and the camera parameters, with a dynamic analysis model (e.g., with temporal coherence in the data), to identify the event parameters. In some implementations, the dynamic analysis model may identify patterns of objects that occur over time in a scene to identify segments in the scene. For example, the dynamic analysis model may identify sidewalks based on pedestrians being able to walk at any time, may identify parking spaces based on vehicles remaining in a same location for periods of time, and/or the like.

In some implementations, the scene model may include a machine learning model. Registration platform 115 may train the scene model with historical data (e.g., historical location data, historical map data, historical camera parameters, and/or the like) to generate event parameters. For example, registration platform 115 may train the scene model in a manner similar to the machine learning model described above in connection with FIG. 1C. In some implementations, rather than training the scene model, registration platform 115 may obtain the scene model from another system or device that trained the scene model. In this case, registration platform 115 may provide the other system or device with historical data for use in training the parameter optimization model, and may provide the other system or device with updated historical data to retrain the scene model in order to update the scene model.

Figure 1G:
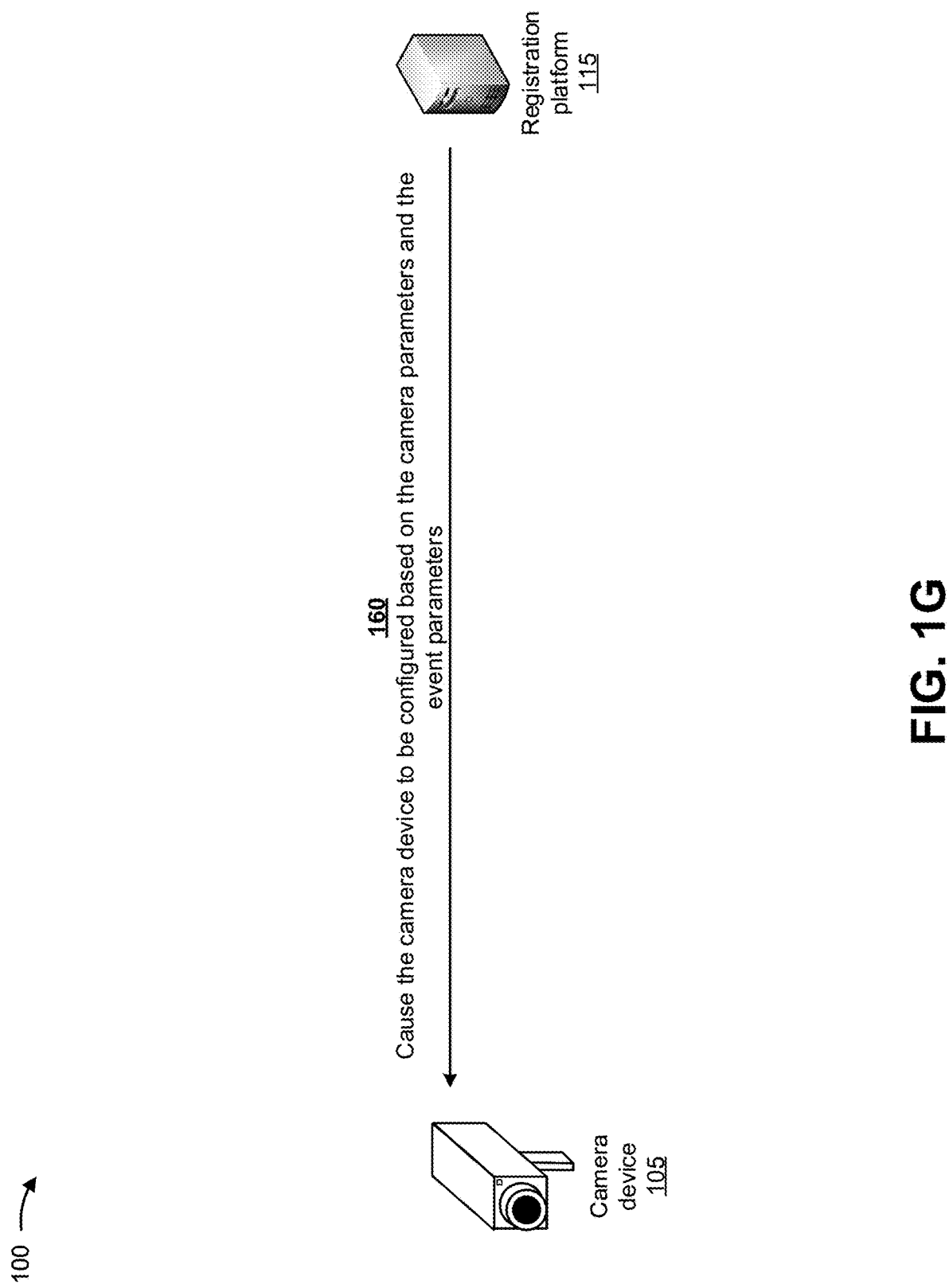

As shown in FIG. 1G, and by reference number 160, registration platform 115 may cause camera device 105 to be configured based on the camera parameters and the event parameters. For example, registration platform 115 may cause camera device 105 to implement the camera parameters and/or the event parameters, which may cause camera device 105 to adjust its imaging facilities (e.g., lens, aperture, imager, and/or the like), to apply different filtering/transform operations to collected images, to be differently positioned (e.g., horizontally and/or vertically), to be differently oriented (e.g., horizontally and/or vertically), to be differently scoped (e.g., zoomed), to be differently focused, to be serviced, to be upgraded, to handle scenes in a particular manner, and/or the like.

Figure 1H:
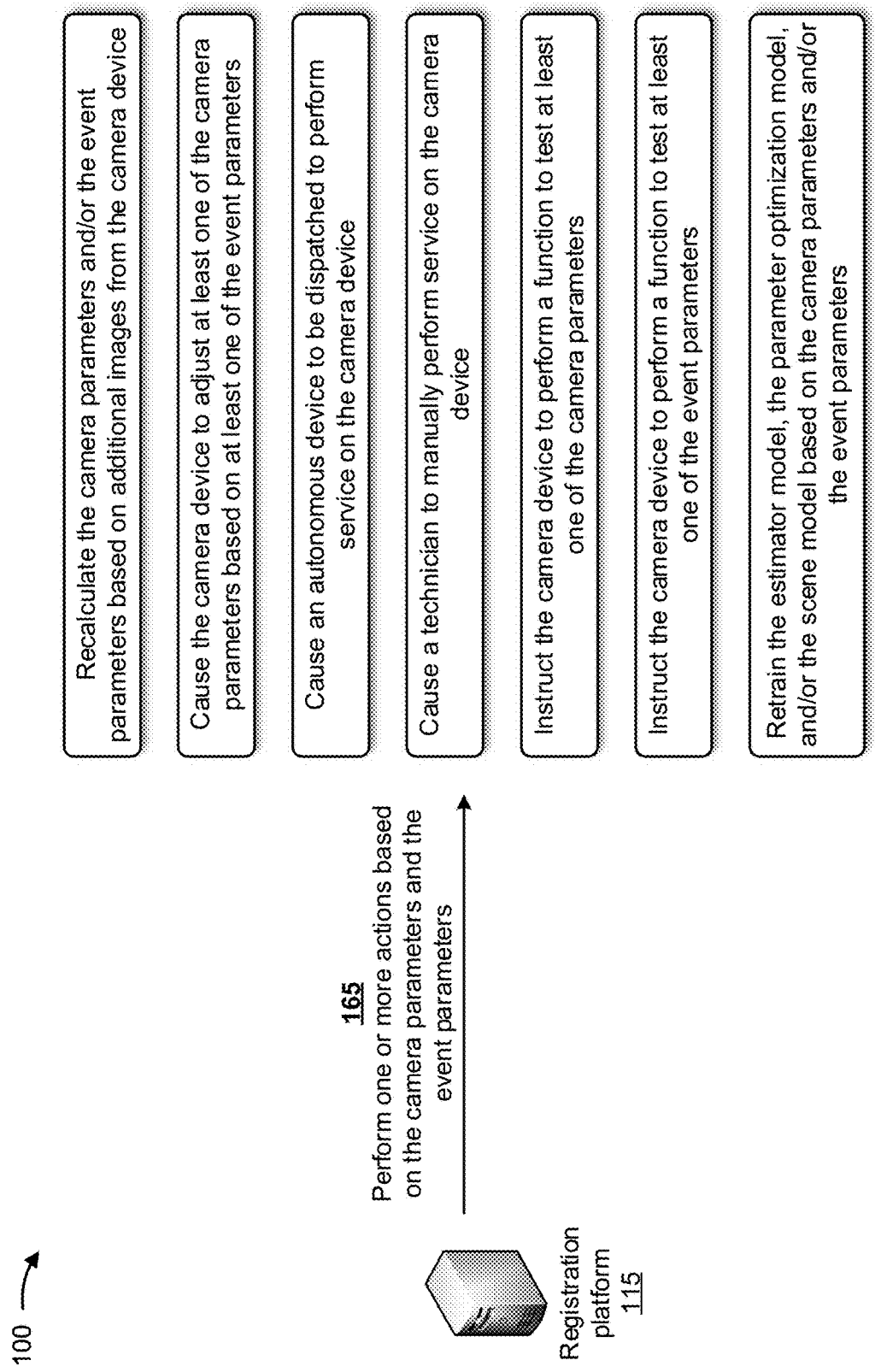

As shown in FIG. 1H, and by reference number 165, registration platform 115 may perform one or more actions based on the camera parameters and the event parameters. In some implementations, the one or more actions may include recalculating the camera parameters and/or the event parameters based on additional images received from camera device 105. For example, registration platform 115 may recalculate, based on the additional images, a parameter identifying a type of device associated with camera device 105, a parameter identifying a location of camera device 105, a parameter identifying a height associated with camera device 105, a parameter identifying an elevation associated with camera device 105, a parameter identifying a leveling associated with camera device 105, a parameter identifying a parking space at a location of camera device 105, a parameter identifying a road surface at a location of camera device 105, a parameter identifying a road marker at a location of camera device 105, a parameter identifying a traffic signal at a location of camera device 105, a parameter identifying a pedestrian crosswalk at a location of camera device 105, a parameter identifying a road lane at a location of camera device 105, a parameter identifying a sidewalk at a location of camera device 105, and/or the like. In this way, registration platform 115 may improve recognition of images and/or information captured by camera device 105, which may allow a system that utilizes camera device 105 to operate more efficiently and/or effectively, thereby conserving computing resources, networking resources, and/or the like required to manage the system, improving safety (e.g., by reducing accidents), conserving energy resources (e.g., by adjusting lighting and/or other powered devices based on the information captured by camera device 105), and/or the like.

In some implementations, the one or more actions may include causing camera device 105 to adjust at least one of the camera parameters based on at least one of the event parameters. For example, registration platform 115 may adjust a camera parameter identifying a type of device associated with camera device 105, a parameter identifying a location of camera device 105, a parameter identifying a height associated with camera device 105, a parameter identifying an elevation associated with camera device 105, a parameter identifying a leveling associated with camera device 105, and/or a parameter identifying a yaw associated with camera device 105, based on a parameter identifying a parking space at a location of camera device 105, a parameter identifying a road surface at a location of camera device 105, a parameter identifying a road marker at a location of camera device 105, a parameter identifying a traffic signal at a location of camera device 105, a parameter identifying a pedestrian crosswalk at a location of camera device 105, a parameter identifying a road lane at a location of camera device 105, a parameter identifying a sidewalk at a location of camera device 105, and/or the like. In this way, registration platform 115 may utilize event parameters associated with aspects of a scene captured by camera device 105 to improve accuracy of the camera parameters, which may improve recognition of images and/or information captured by camera device 105. This may allow a system that utilizes camera device 105 to operate more efficiently and/or effectively, thereby conserving computing resources, networking resources, and/or the like required to manage the system, improving safety, conserving energy resources, and/or the like.

In some implementations, the one or more actions may include causing an autonomous device to be dispatched to perform service on camera device 105. For example, registration platform 115 may cause a robot, an unmanned aerial vehicle (UAV), and/or the like to be dispatched to service camera device 105, repair camera device 105, adjust camera device 105, calibrate camera device 105, reboot camera device 105, reconfigure camera device 105, replace camera device 105, and/or the like. In this way, registration platform 115 may automatically improve accuracy and/or efficiency of camera device 105, which may conserve resources associated with a system that utilizes camera device 105.

In some implementations, the one or more actions may include causing a technician to manually perform service on camera device 105. For example, registration platform 115 may cause a technician to manually service camera device 105, repair camera device 105, adjust camera device 105, calibrate camera device 105, reboot camera device 105, reconfigure camera device 105, and/or the like. In this way, registration platform 115 may automatically select personnel that will be effective in improving an accuracy and/or efficiency of camera device 105, which may conserve resources associated with a system that utilizes camera device 105.

In some implementations, the one or more actions may include instructing camera device 105 to perform a function to test at least one of the camera parameters. For example, registration platform 115 may instruct camera device 105 to perform a function to test a parameter identifying a type of device associated with camera device 105, a parameter identifying a location of camera device 105, a parameter identifying a height associated with camera device 105, a parameter identifying an elevation associated with camera device 105, a parameter identifying a leveling associated with camera device 105, a parameter identifying a yaw associated with camera device 105, and/or the like. In this way, registration platform 115 may ensure accuracy of the camera parameters, which may improve a recognition of images and/or information captured by camera device 10. This may allow a system that utilizes camera device 105 to operate more efficiently and/or effectively, thereby conserving computing resources, networking resources, and/or the like required to manage the system, improving safety, conserving energy resources, and/or the like.

In some implementations, the one or more actions may include instructing camera device 105 to perform a function to test at least one of the event parameters. For example, registration platform 115 may instruct camera device 105 to perform a function to test a parameter identifying a parking space at a location of camera device 105, a parameter identifying a road surface at a location of camera device 105, a parameter identifying a road marker at a location of camera device 105, a parameter identifying a traffic signal at a location of camera device 105, a parameter identifying a pedestrian crosswalk at a location of camera device 105, a parameter identifying a road lane at a location of camera device 105, a parameter identifying a sidewalk at a location of camera device 105, and/or the like. In this way, registration platform 115 may ensure accuracy of the event parameters, which may improve a recognition of images and/or information captured by camera device 105. This may allow a system that utilizes camera device 105 to operate more efficiently and/or effectively, thereby conserving computing resources, networking resources, and/or the like required to manage the system, improving safety, conserving energy resources, and/or the like.

In some implementations, the one or more actions may include retraining the estimator model, the parameter optimization model, and/or the scene model based on the camera parameters and/or the event parameters. In this way, registration platform 115 may improve the accuracy of the estimator model in generating estimated camera parameters, may improve the accuracy of the parameter optimization model in identifying camera parameters, and/or may improve the accuracy of the scene model in identifying event parameters, which may improve speed and efficiency of the estimator model, the parameter optimization model, and/or the scene model, thereby conserving computing resources, networking resources, and/or the like.

In this way, the configuration of deployed cameras may be automated via various modeling techniques, which may remove human subjectivity and waste from the process, and which may improve speed and efficiency of the process and conserve computing resources (e.g., processing resources, memory resources, communication resources, and/or the like), networking resources, and/or the like. Furthermore, implementations described herein use a rigorous, computerized process to perform tasks or roles that were not previously performed or were previously performed using subjective human intuition or input. For example, currently there does not exist a technique that utilizes modeling to automatically configure deployed video cameras in the manner described herein. Finally, the process for utilizing modeling to automatically configure deployed video cameras reduces time that would be required to have a technician manually measure and configure a video camera, and conserves computing resources, networking resources, human resources and/or the like, and/or the like that would otherwise be wasted.

Although, implementations described herein are described in connection with a single camera device 105, in some implementations, registration platform 115 may handle thousands, millions, billions, and/or the like, of data records associated with thousands of camera devices 105 installed in hundreds to thousands of geographic areas within a period of time (e. g., daily, weekly, monthly), and thus may employ capabilities for processing large data sets. The large amount of data handled by such implementations cannot be used and/or processed manually by humans.

Furthermore, registration platform 115 may perform the functionality described herein when camera devices 105 are installed, periodically after installation (e.g., to check on camera device configurations and to make adjustments to camera devices 105), when camera devices 105 move (e.g., due to weather, relocation, and/or the like). In some implementations, registration platform 115 may utilize a machine learning model to determine when to perform retesting of camera devices 105 to determine whether camera devices 105 need to be reconfigured.

As indicated above, FIGS. 1A-1H are provided merely as examples. Other examples may differ from what was described with regard to FIGS. 1A-1H. The number and arrangement of devices and networks shown in FIGS. 1A-1H are provided as an example. In practice, there may be additional devices and/or networks, fewer devices and/or networks, different devices and/or networks, or differently arranged devices and/or networks than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) of FIGS. 1A-1H may perform one or more functions described as being performed by another set of devices of FIGS. 1A-1H.

Figure 2:
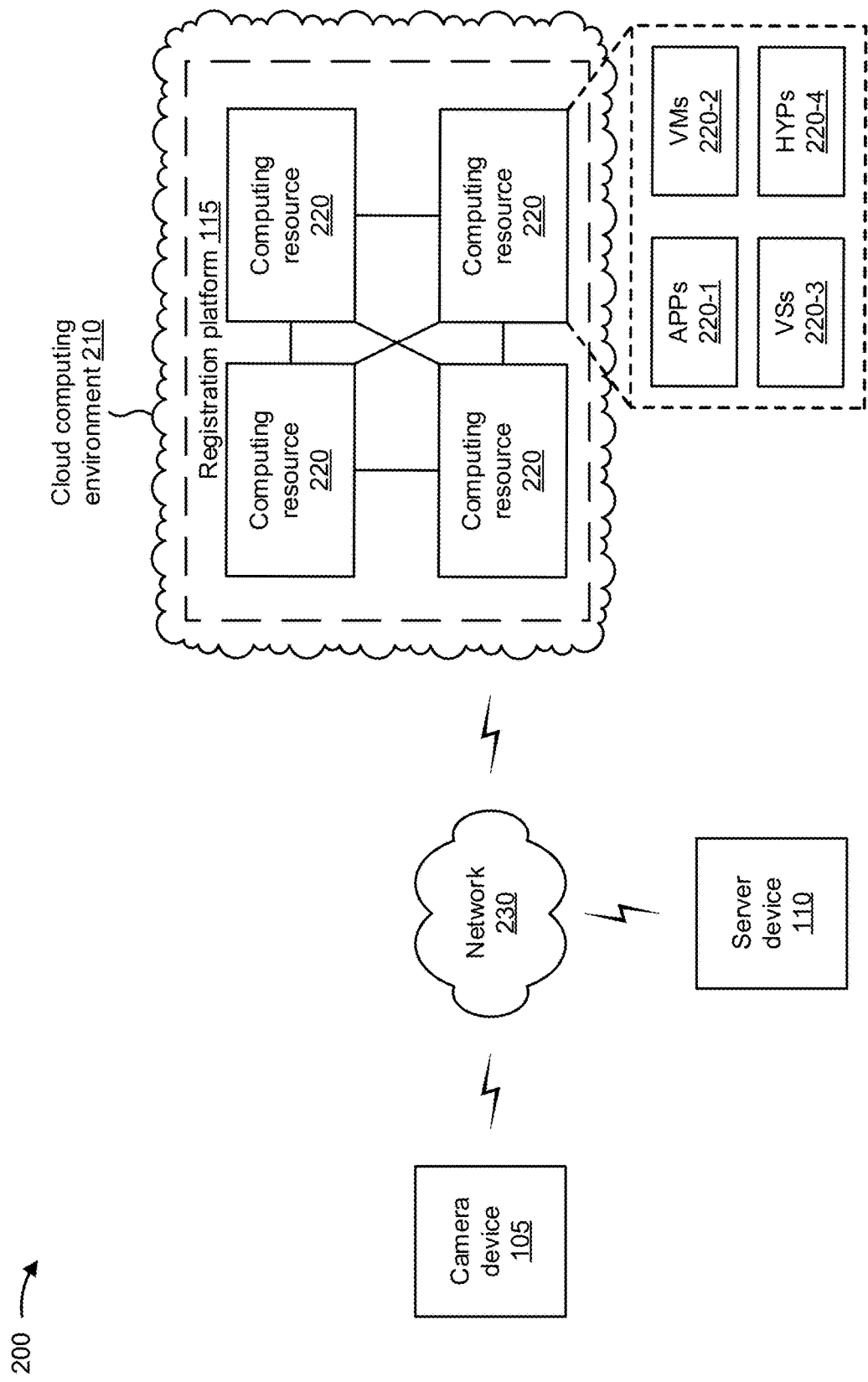
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include camera device 105, server device 110 registration platform 115, and a network 230. Devices of environment 200 may interconnect via wired connections, wireless connections, or a combination of wired and wireless connections.

Camera device 105 includes one or more devices capable of receiving, generating, storing, processing, and/or providing information, such as information described herein. For example, camera device 105 may include a mobile phone (e.g., a smart phone, a radiotelephone, and/or the like) equipped with a camera, a computer equipped with an internal or external camera, an image and/or video capturing device, a three-hundred and sixty-degree camera, a digital camera, a video camera, a lidar device, a radar device, an ultrasound device, or a similar type of device. In some implementations, camera device 105 may receive information from and/or transmit information to server device 110 and/or registration platform 115.

Server device 110 includes one or more devices capable of receiving, generating, storing, processing, and/or providing information, as described herein. For example, server device 110 may include a laptop computer, a tablet computer, a desktop computer, a group of server devices, or a similar type of device, associated with entities that require navigation of interiors of buildings. In some implementations, server device 110 may receive information from and/or transmit information to camera device 105 and/or registration platform 115.

Registration platform 115 includes one or more devices that utilize modeling to automatically determine configuration parameters for cameras. In some implementations, registration platform 115 may be designed to be modular such that certain software components may be swapped in or out depending on a particular need. As such, registration platform 115 may be easily and/or quickly reconfigured for different uses. In some implementations, registration platform 115 may receive information from and/or transmit information to one or more camera devices 105 and/or one or more server devices 110.

In some implementations, as shown, registration platform 115 may be hosted in a cloud computing environment 210. Notably, while implementations described herein describe registration platform 115 as being hosted in cloud computing environment 210, in some implementations, registration platform 115 may not be cloud-based (i.e., may be implemented outside of a cloud computing environment) or may be partially cloud-based.

Cloud computing environment 210 includes an environment that hosts registration platform 115. Cloud computing environment 210 may provide computation, software, data access, storage, etc., services that do not require end-user knowledge of a physical location and configuration of system(s) and/or device(s) that hosts registration platform 115. As shown, cloud computing environment 210 may include a group of computing resources 220 (referred to collectively as "computing resources 220" and individually as "computing resource 220").

Computing resource 220 includes one or more personal computers, workstation computers, mainframe devices, or other types of computation and/or communication devices. In some implementations, computing resource 220 may host registration platform 115. The cloud resources may include compute instances executing in computing resource 220, storage devices provided in computing resource 220, data transfer devices provided by computing resource 220, etc. In some implementations, computing resource 220 may communicate with other computing resources 220 via wired connections, wireless connections, or a combination of wired and wireless connections.

As further shown in FIG. 2, computing resource 220 includes a group of cloud resources, such as one or more applications ("APPs") 220-1, one or more virtual machines ("VMs") 220-2, virtualized storage ("VSs") 220-3, one or more hypervisors ("HYPs") 220-4, and/or the like.

Application 220-1 includes one or more software applications that may be provided to or accessed by camera device 105. Application 220-1 may eliminate a need to install and execute the software applications on camera device 105. For example, application 220-1 may include software associated with registration platform 115 and/or any other software capable of being provided via cloud computing environment 210. In some implementations, one application 220-1 may send/receive information to/from one or more other applications 220-1, via virtual machine 220-2.

Virtual machine 220-2 includes a software implementation of a machine (e.g., a computer) that executes programs like a physical machine. Virtual machine 220-2 may be either a system virtual machine or a process virtual machine, depending upon use and degree of correspondence to any real machine by virtual machine 220-2. A system virtual machine may provide a complete system platform that supports execution of a complete operating system ("OS"). A process virtual machine may execute a single program and may support a single process. In some implementations, virtual machine 220-2 may execute on behalf of a user (e.g., a user of camera device 105 or an operator of registration platform 115), and may manage infrastructure of cloud computing environment 210, such as data management, synchronization, or long-duration data transfers.

Virtualized storage 220-3 includes one or more storage systems and/or one or more devices that use virtualization techniques within the storage systems or devices of computing resource 220. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 220-4 may provide hardware virtualization techniques that allow multiple operating systems (e.g., "guest operating systems") to execute concurrently on a host computer, such as computing resource 220. Hypervisor 220-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
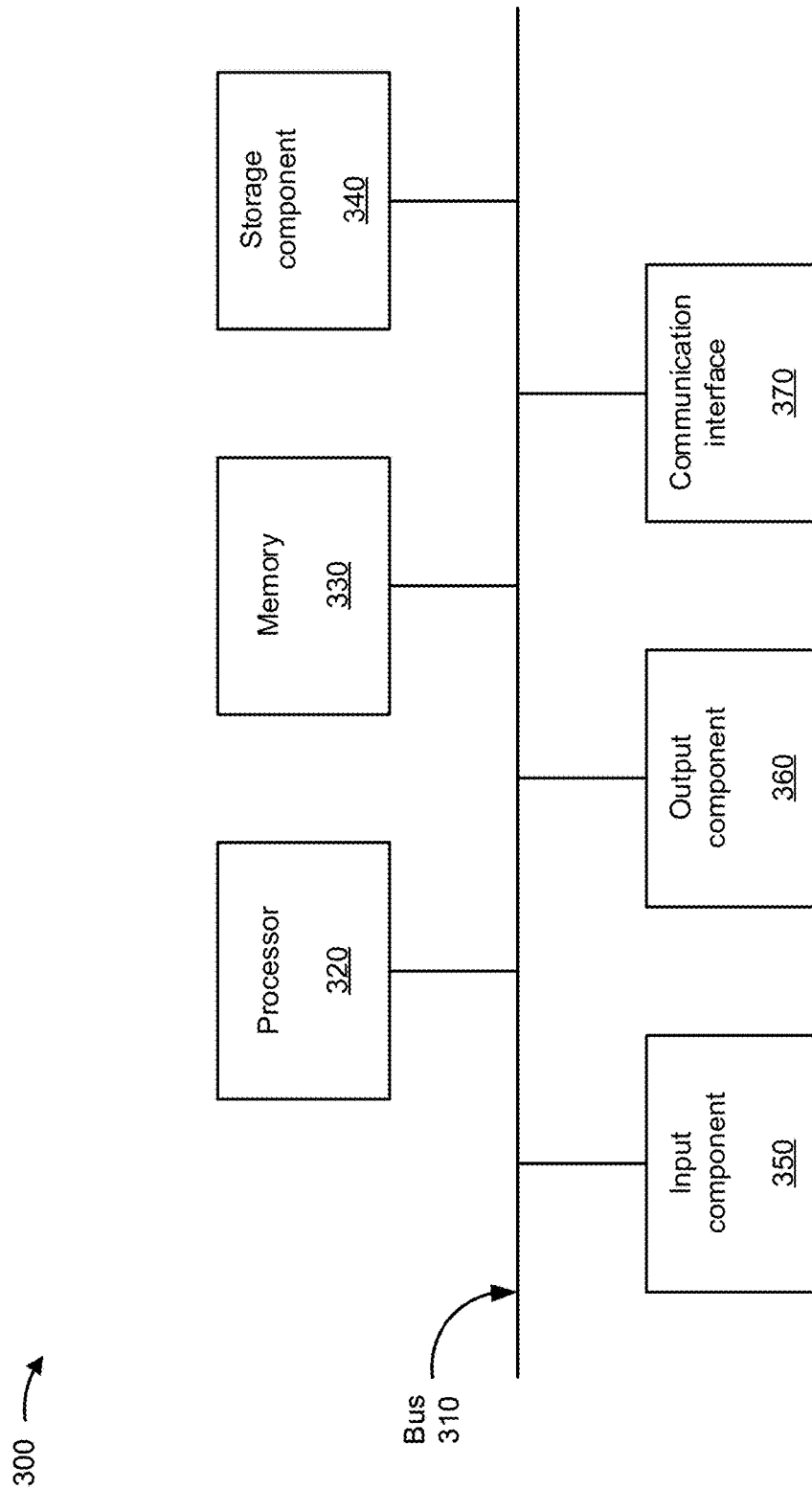
FIG. 3 is a diagram of example components of one or more devices of FIG. 2.

FIG. 3 is a diagram of example components of a device 300. Device 300 may correspond to camera device 105, server device 110, registration platform 115, and/or computing resource 220. In some implementations, camera device 105, server device 110, registration platform 115, and/or computing resource 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
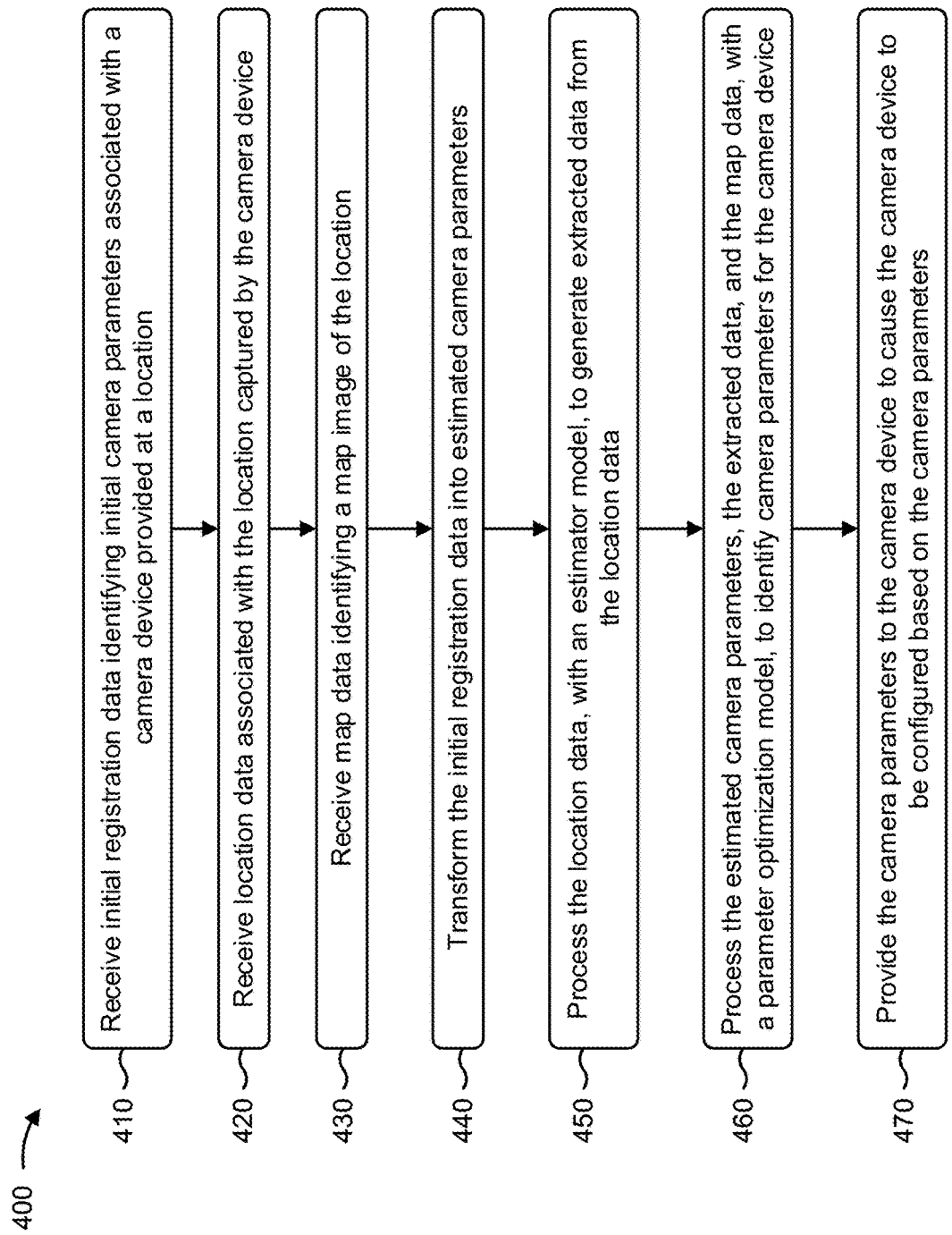
FIG. 4 is a flow chart of an example process for utilizing modeling to automatically determine configuration parameters for cameras.

FIG. 4 is a flow chart of an example process 400 for utilizing modeling to automatically determine camera parameters for cameras. In some implementations, one or more process blocks of FIG. 4 may be performed by a device (e.g., registration platform 115). In some implementations, one or more process blocks of FIG. 4 may be performed by another device or a group of devices separate from or including the device, such as a camera device (e.g., camera device 105) and/or a server device (e.g., server device 110).

As shown in FIG. 4, process 400 may include receiving initial registration data identifying initial camera parameters associated with a camera device provided at a location (block 410). For example, the device (e.g., using computing resource 220, processor 320, communication interface 370, and/or the like) may receive initial registration data identifying initial camera parameters associated with a camera device provided at a location, as described above. The initial camera parameters may include a parameter identifying a type of device associated with the camera device, a parameter identifying the location, a parameter identifying a height associated with the camera device, a parameter identifying an elevation associated with the camera device, a parameter identifying a leveling associated with the camera device, or a parameter identifying a yaw associated with the camera device.

As further shown in FIG. 4, process 400 may include receiving location data associated with the location captured by the camera device (block 420). For example, the device (e.g., using computing resource 220, processor 320, memory 330, communication interface 370, and/or the like) may receive location data associated with the location captured by the camera device, as described above.

As further shown in FIG. 4, process 400 may include receiving map data identifying a map image of the location (block 430). For example, the device (e.g., using computing resource 220, processor 320, storage component 340, communication interface 370, and/or the like) may receive map data identifying a map image of the location, as described above. In some implementations, receiving the map data identifying a map image of the location may include determining the location of the camera device based on at least one of the initial registration data or the location data; providing, to a server device, a request for map data associated with the location; and receiving, from the server device, the map data based on the request.

As further shown in FIG. 4, process 400 may include transforming the initial registration data into estimated camera parameters (block 440). For example, the device (e.g., using computing resource 220, processor 320, memory 330, and/or the like) may transform the initial registration data into estimated camera parameters, as described above. In some implementations, transforming the initial registration data into the estimated camera parameters may include determining an estimated orientation of the camera device based on the initial registration data identifying a planar ground, a yaw angle, a leveling angle and an elevation angle associated with the camera device; determining estimated metric information of the camera device based on the estimated orientation and the location and height associated with the camera device; and determining an estimated ground plane of the camera device based on the estimated orientation and the estimated metric information.

As further shown in FIG. 4, process 400 may include processing the location data, with an estimator model, to generate extracted data (block 450). For example, the device (e.g., using computing resource 220, processor 320, storage component 340, and/or the like) may process the location data, with the estimator model, to generate extracted data, as described above.

In some implementations, processing the location data, with the estimator model, to generate the extracted data may include receiving additional location data from a plurality of camera devices substantially similar to the camera device; and processing the location data and the additional location data, with the estimator model, to generate the extracted data.

As further shown in FIG. 4, process 400 may include processing the estimated camera parameters, the extracted data, and the map data, with a parameter optimization model, to identify camera parameters for the camera device (block 460). For example, the device (e.g., using computing resource 220, processor 320, memory 330, storage component 340, and/or the like) may process the estimated camera parameters, the extracted data, and the map data, with a parameter optimization model, to identify camera parameters for the camera device, as described above. The parameter optimization model may include a nonlinear optimization model that optimizes the camera parameters.

In some implementations, processing the estimated camera parameters, the extracted data, and the map data, with a parameter optimization model may include determining an estimated field of view of the camera device based on objects included in the location data; determining an estimated lens distortion of the camera device based on objects included in the location data and a planar ground associated with the camera device; determining estimated metric information of the camera device based on objects included in the location data; and determining an estimated ground plane of the camera device based on objects included in the location data and the estimated lens distortion, where the estimated field of view, the estimated lens distortion, the estimated metric information, and the estimated ground plane may correspond to the extracted data.

As further shown in FIG. 4, process 400 may include providing the camera parameters to the camera device to cause the camera device to be configured based on the camera parameters (block 470). For example, the device (e.g., using computing resource 220, processor 320, memory 330, storage component 340, communication interface 370, and/or the like) may provide the camera parameters to the camera device to cause the camera device to be configured based on the camera parameters, as described above.

Process 400 may include additional implementations, such as any single implementation or any combination of implementations described below and/or in connection with one or more other processes described elsewhere herein.

In some implementations, process 400 may include recalculating the camera parameters based on additional images received from the camera device; causing the camera device to adjust at least one of the camera parameters; or causing an autonomous device to be dispatched to perform service on the camera device based on the camera parameters.

In some implementations, process 400 may include causing a technician to manually perform service on the camera device based on the camera parameters; instructing the camera device to perform a function to test at least one of the camera parameters; or retraining the estimator model or the parameter optimization model based on the camera parameters.

In some implementations, process 400 may include processing the extracted data, the map data, and the camera parameters, with a scene model, to identify event parameters, and providing the event parameters to the camera device.

In some implementations, process 400 may include processing the extracted data, the map data, and the camera parameters, with a static analysis model, to identify event parameters; and providing the event parameters to the camera device.

In some implementations, process 400 may include processing the extracted data, the map data, and the camera parameters, with a dynamic analysis model, to identify event parameters; and providing the event parameters to the camera device. The event parameters may include a parameter identifying a parking space at the location, a parameter identifying a road surface at the location, a parameter identifying a road marker at the location, a parameter identifying a traffic signal at the location, a parameter identifying a pedestrian crosswalk at the location, a parameter identifying a road lane at the location, or a parameter identifying a sidewalk at the location.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method comprising:
receiving, by a device, initial registration data identifying initial camera parameters associated with a camera device provided at a location;
receiving, by the device, location data associated with the location captured by the camera device;

receiving, by the device, map data identifying a map image of the location;
transforming, by the device, the initial registration data into estimated camera parameters,
  wherein transforming the initial registration data into the estimated camera parameters comprises:
    determining an estimated orientation of the camera device based on the initial registration data identifying a planar ground, an elevation angle, a leveling angle, and a yaw angle associated with the camera device;
    determining estimated metric information of the camera device based on the estimated orientation and the location and a height associated with the camera device; and
    determining an estimated ground plane of the camera device based on the estimated orientation and metric information,
      wherein the estimated orientation, the estimated metric information, and the estimated ground plane correspond to the estimated camera parameters;
processing, by the device, the location data, with an estimator model, to generate extracted data;
processing, by the device, the estimated camera parameters, the extracted data, and the map data, with a parameter optimization model, to identify camera parameters for the camera device; and
providing, by the device, the camera parameters to the camera device to cause the camera device to be configured based on the camera parameters.

2. The method of claim 1, wherein the initial camera parameters include one or more of:
a parameter identifying a type of device associated with the camera device,
a parameter identifying the location,
a parameter identifying the height associated with the camera device,
a parameter identifying the elevation angle associated with the camera device,
a parameter identifying the leveling angle associated with the camera device, or
a parameter identifying the yaw angle associated with the camera device.

3. The method of claim 1, wherein receiving the map data identifying the map image of the location comprises:
determining the location of the camera device based on at least one of the initial registration data or the location data;
providing, to a server device, a request for map data associated with the location; and
receiving, from the server device, the map data based on the request.

4. The method of claim 1, further comprising one or more of:
recalculating the camera parameters based on additional images received from the camera device;
causing the camera device to adjust at least one of the camera parameters; or
causing an autonomous device to be dispatched to perform service on the camera device based on the camera parameters.

5. The method of claim 1, further comprising one or more of:
causing a technician to manually perform service on the camera device based on the camera parameters;
instructing the camera device to perform a function to test at least one of the camera parameters; or
retraining the estimator model or the parameter optimization model based on the camera parameters.

6. The method of claim 1, further comprising:
processing the extracted data, the map data, and the camera parameters, with a scene model, to identify event parameters; and
providing the event parameters to the camera device.

7. The method of claim 1, further comprising:
determining an estimated lens distortion of the camera device based on the planar ground, and
wherein determining the estimated ground plane of the camera device is additionally based on the estimated lens distortion.

8. A non-transitory computer-readable medium storing a set of instructions, the set of instructions comprising:
one or more instructions that, when executed by one or more processors of a device, cause the device to:
  receive initial registration data identifying initial camera parameters associated with a camera device provided at a location;
  receive location data associated with the location captured by the camera device;
  receive map data identifying a map image of the location;
  transform the initial registration data into estimated camera parameters,
    wherein the one or more instructions, that cause the device to transform the initial registration data into the estimated camera parameters, cause the device to:
      determine an estimated orientation of the camera device based on the initial registration data identifying a planar ground, an elevation angle, a leveling angle, and a yaw angle associated with the camera device;
      determine estimated metric information of the camera device based on the estimated orientation and the location and a height associated with the camera device; and
      determine an estimated ground plane of the camera device based on the estimated orientation and metric information,
        wherein the estimated orientation, the estimated metric information, and the estimated ground plane correspond to the estimated camera parameters;
  process the location data, with an estimator model, to generate extracted data;
  process the estimated camera parameters, the extracted data, and the map data, with a parameter optimization model, to identify camera parameters for the camera device; and
  provide the camera parameters to the camera device to cause the camera device to be configured based on the camera parameters.

9. The non-transitory computer-readable medium of claim 8, wherein the initial camera parameters include one or more of:
parameter identifying a type of device associated with the camera device,
a parameter identifying the location,
a parameter identifying the height associated with the camera device,
a parameter identifying the elevation angle associated with the camera device,
a parameter identifying the leveling angle associated with the camera device, or a parameter identifying the yaw angle associated with the camera device.

10. The non-transitory computer-readable medium of claim 8, wherein the one or more instructions, that cause the device to receive the map data identifying the map image of the location, cause the device to:
 determine the location of the camera device based on at least one of the initial registration data or the location data;
 provide, to a server device, a request for map data associated with the location; and
 receive, from the server device, the map data based on the request.

11. The non-transitory computer-readable medium of claim 8, wherein the one or more instructions further cause the device to one or more of:
 recalculate the camera parameters based on additional images received from the camera device;
 cause the camera device to adjust at least one of the camera parameters; or
 cause an autonomous device to be dispatched to perform service on the camera device based on the camera parameters.

12. The non-transitory computer-readable medium of claim 8, wherein the one or more instructions further cause the device to one or more of:
 cause a technician to manually perform service on the camera device based on the camera parameters;
 instruct the camera device to perform a function to test at least one of the camera parameters; or
 retrain the estimator model or the parameter optimization model based on the camera parameters.

13. The non-transitory computer-readable medium of claim 8, wherein the one or more instructions further cause the device to:
 process the extracted data, the map data, and the camera parameters, with a scene model, to identify event parameters; and
 provide the event parameters to the camera device.

14. The non-transitory computer-readable medium of claim 8, wherein the one or more instructions, that cause the device to process the location data to generate the extracted data, cause the device to:
 receive additional location data from a plurality of camera devices, and
 process, using batch optimization, the location data and the additional location data with the estimator model to generate the extracted data.

15. A device, comprising:
 one or more processors configured to:
  receive initial registration data identifying initial camera parameters associated with a camera device provided at a location;
  receive location data associated with the location captured by the camera device;
  receive map data identifying a map image of the location;
  transform the initial registration data into estimated camera parameters,
   wherein the one or more processors, when transforming the initial registration data into the estimated camera parameters, are configured to:
    determine an estimated orientation of the camera device based on the initial registration data identifying a planar ground, an elevation angle, a leveling angle, and a yaw angle associated with the camera device;
    determine estimated metric information of the camera device based on the estimated orientation and the location and a height associated with the camera device; and
    determine an estimated ground plane of the camera device based on the estimated orientation and metric information,
     wherein the estimated orientation, the estimated metric information, and the estimated ground plane correspond to the estimated camera parameters;
  process the location data, with an estimator model, to generate extracted data;
  process the estimated camera parameters, the extracted data, and the map data, with a parameter optimization model, to identify camera parameters for the camera device; and
  provide the camera parameters to the camera device to cause the camera device to be configured based on the camera parameters.

16. The device of claim 15, wherein the initial camera parameters include one or more of:
 parameter identifying a type of device associated with the camera device,
 a parameter identifying the location,
 a parameter identifying the height associated with the camera device,
 a parameter identifying the elevation angle associated with the camera device,
 a parameter identifying the leveling angle associated with the camera device, or
 a parameter identifying the yaw angle associated with the camera device.

17. The device of claim 15, wherein the one or more processors, when receiving the map data identifying the map image of the location, are configured to:
 determine the location of the camera device based on at least one of the initial registration data or the location data;
 provide, to a server device, a request for map data associated with the location; and
 receive, from the server device, the map data based on the request.

18. The device of claim 15, wherein the one or more processors are further configured to one or more of:
 recalculate the camera parameters based on additional images received from the camera device;
 cause the camera device to adjust at least one of the camera parameters; or
 cause an autonomous device to be dispatched to perform service on the camera device based on the camera parameters.

19. The device of claim 15, wherein the one or more processors are further configured to one or more of:
 cause a technician to manually perform service on the camera device based on the camera parameters;
 instruct the camera device to perform a function to test at least one of the camera parameters; or
 retrain the estimator model or the parameter optimization model based on the camera parameters.

20. The device of claim 15, wherein the one or more processors are further configured to:
   process the extracted data, the map data, and the camera parameters, with a scene model, to identify event parameters; and
   provide the event parameters to the camera device.

* * * * *